(12) United States Patent
Dasgupta et al.

(10) Patent No.: US 9,958,360 B2
(45) Date of Patent: May 1, 2018

(54) ENERGY AUDIT DEVICE

(71) Applicant: Opower, Inc., Arlington, VA (US)

(72) Inventors: Arjun Dasgupta, Bethesda, MD (US); Brian Preston, San Leandro, CA (US); Niklas Philipsen, Washington, DC (US); Euan Davidson, San Francisco, CA (US); Jared Culp, Alexandria, VA (US); Matt Greenfield, New Haven, CT (US)

(73) Assignee: OPOWER, INC., Arlington, VA (US)

( * ) Notice: Subject to any disclaimer, the term of this patent is extended or adjusted under 35 U.S.C. 154(b) by 292 days.

(21) Appl. No.: 14/819,389

(22) Filed: Aug. 5, 2015

(65) Prior Publication Data
US 2017/0038279 A1 Feb. 9, 2017

(51) Int. Cl.
*G01M 99/00* (2011.01)
*G06Q 10/06* (2012.01)
*G06Q 50/06* (2012.01)

(52) U.S. Cl.
CPC ............ *G01M 99/00* (2013.01); *G06Q 10/06* (2013.01); *G06Q 50/06* (2013.01)

(58) Field of Classification Search
CPC ............... G06Q 50/06; G05B 15/02; G05B 2219/2642; G05B 2219/2639; F24F 2011/0075; F24F 11/0086; F24F 2011/0047
USPC ........ 700/291, 295, 297, 278, 277; 705/412; 702/62, 130, 136
See application file for complete search history.

(56) References Cited

U.S. PATENT DOCUMENTS

| 4,334,275 A | 6/1982 | Levine |
| 4,843,575 A | 6/1989 | Crane |
| 5,513,519 A | 5/1996 | Cauger et al. |
| 5,566,084 A | 10/1996 | Cmar |
| 5,717,609 A | 2/1998 | Packa et al. |

(Continued)

FOREIGN PATENT DOCUMENTS

| AU | 2010315015 | 7/2014 |
| CA | 2779754 | 5/2011 |

(Continued)

OTHER PUBLICATIONS

Patent Cooperation Treaty (PCT), International Search Report and Written Opinion in co-pending PCT International Application No. PCT/US2016/045687, International Filing Date: Aug. 5, 2016, dated Oct. 11, 2016 (10 pgs).

(Continued)

*Primary Examiner* — Jonathan Han
(74) *Attorney, Agent, or Firm* — Cooper Legal Group, LLC

(57) ABSTRACT

Aspects of the subject technology relate to an energy audit device configured for identifying one or more sources of thermal energy loss. In some implementation, the audit device includes one or more processors, a memory coupled to the processors, a location module coupled to the processors, and one or more environmental sensors. In practice, the processors can be configured to perform various operations including: receiving a first set of environmental measurements, receiving a second set of environmental measurements, and identifying one or more thermal energy leaks at a building location based on the first and second sets of environmental measurements.

19 Claims, 5 Drawing Sheets

(56) References Cited

U.S. PATENT DOCUMENTS

| | | |
|---|---|---|
| 5,855,011 A | 12/1998 | Tatsuoka |
| 5,873,251 A | 2/1999 | Iino |
| 5,930,773 A | 7/1999 | Crooks et al. |
| 5,930,803 A | 7/1999 | Becker et al. |
| 5,948,303 A | 9/1999 | Larson |
| 6,035,285 A | 3/2000 | Schlect et al. |
| 6,088,688 A | 7/2000 | Crooks et al. |
| 6,295,504 B1 | 9/2001 | Ye et al. |
| 6,327,605 B2 | 12/2001 | Arakawa et al. |
| D462,077 S | 8/2002 | Greminger |
| 6,606,104 B1 | 8/2003 | Kondo et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| D605,652 S | 12/2009 | Plaisted et al. |
| 7,878,890 B2 | 2/2011 | Toyohara et al. |
| 7,991,513 B2 | 8/2011 | Pitt |
| 8,065,098 B2 | 11/2011 | Gautam |
| 8,166,047 B1 | 4/2012 | Cohen et al. |
| D660,867 S | 5/2012 | Marchetti |
| 8,180,591 B2 | 5/2012 | Yuen et al. |
| D665,411 S | 8/2012 | Rai et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| D671,550 S | 11/2012 | Chen et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,428,785 B2 | 4/2013 | Boucher et al. |
| 8,429,630 B2 | 4/2013 | Nickolov et al. |
| 8,478,447 B2 | 7/2013 | Fadell et al. |
| 8,489,245 B2 | 7/2013 | Carrel et al. |
| D687,445 S | 8/2013 | Fuhrmann |
| D694,252 S | 11/2013 | Helm |
| 8,583,288 B1 | 11/2013 | Rossi et al. |
| D697,526 S | 1/2014 | Bruck et al. |
| 8,630,741 B1 | 1/2014 | Matsuoka et al. |
| 8,660,813 B2 | 2/2014 | Curtis et al. |
| D703,690 S | 4/2014 | MacCubbin et al. |
| 8,690,751 B2 | 4/2014 | Auphan |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby |
| 8,818,758 B1 | 8/2014 | Singh et al. |
| D714,335 S | 9/2014 | Cojuangco et al. |
| 8,868,248 B2 | 10/2014 | Park |
| D717,328 S | 11/2014 | Lin |
| D720,767 S | 1/2015 | Miller et al. |
| 8,954,849 B2 | 2/2015 | Doi et al. |
| D725,133 S | 3/2015 | Smirin et al. |
| D725,664 S | 3/2015 | Nies et al. |
| D729,268 S | 5/2015 | Nies et al. |
| D730,386 S | 5/2015 | Ryan et al. |
| 9,031,703 B2 | 5/2015 | Nakamura et al. |
| D731,538 S | 6/2015 | Lee |
| D732,049 S | 6/2015 | Amin |
| D732,062 S | 6/2015 | Kwon |
| D740,847 S | 10/2015 | Yampolskiy et al. |
| 2001/0047290 A1 | 11/2001 | Petras et al. |
| 2002/0065581 A1 | 5/2002 | Fasca |
| 2002/0178047 A1* | 11/2002 | Or ............ G06Q 10/04 705/412 |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0093222 A1 | 5/2006 | Saffer et al. |
| 2006/0103549 A1 | 5/2006 | Hunt et al. |
| 2006/0195438 A1 | 8/2006 | Galuten |
| 2006/0246968 A1 | 11/2006 | Dyke-Wells |
| 2007/0061735 A1 | 3/2007 | Hoffberg et al. |
| 2007/0185835 A1 | 8/2007 | Ursitti et al. |
| 2007/0198459 A1 | 8/2007 | Boone et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0033587 A1 | 2/2008 | Kurita et al. |
| 2008/0167535 A1 | 7/2008 | Stivoric et al. |
| 2008/0189632 A1 | 8/2008 | Tien et al. |
| 2008/0195561 A1 | 8/2008 | Herzig |
| 2008/0222561 A1 | 9/2008 | Helfman et al. |
| 2008/0244429 A1 | 10/2008 | Stading |
| 2008/0281473 A1 | 11/2008 | Pitt |
| 2008/0281763 A1 | 11/2008 | Yliniemi |
| 2008/0304112 A1 | 12/2008 | Matsuno |
| 2008/0306985 A1 | 12/2008 | Murray et al. |
| 2009/0106202 A1 | 4/2009 | Mizrahi |
| 2009/0106674 A1 | 4/2009 | Bray et al. |
| 2009/0204267 A1 | 8/2009 | Sustaeta et al. |
| 2009/0217175 A1 | 8/2009 | Bechtel et al. |
| 2009/0217179 A1 | 8/2009 | Mons et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1* | 4/2010 | Weaver ............ H02J 3/14 700/295 |
| 2010/0099954 A1 | 4/2010 | Dickinson et al. |
| 2010/0106575 A1 | 4/2010 | Bixby et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0180223 A1 | 7/2010 | Speier |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0241648 A1 | 9/2010 | Ito et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0015798 A1* | 1/2011 | Golden ............ G06Q 10/06 700/291 |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0153102 A1 | 6/2011 | Tyagi et al. |

(56) References Cited

U.S. PATENT DOCUMENTS

| | | | |
|---|---|---|---|
| 2011/0178842 A1 | 7/2011 | Rane et al. | |
| 2011/0178937 A1 | 7/2011 | Bowman | |
| 2011/0205245 A1 | 8/2011 | Kennedy et al. | |
| 2011/0231320 A1 | 9/2011 | Irving | |
| 2011/0251730 A1 | 10/2011 | Pitt | |
| 2011/0251807 A1 | 10/2011 | Rada et al. | |
| 2011/0282505 A1 | 11/2011 | Tomita et al. | |
| 2011/0313964 A1 | 12/2011 | Sanchey Loureda et al. | |
| 2012/0036250 A1 | 2/2012 | Vaswani et al. | |
| 2012/0053740 A1 | 3/2012 | Venkatakrishnan et al. | |
| 2012/0066168 A1 | 3/2012 | Fadell et al. | |
| 2012/0078417 A1* | 3/2012 | Connell, II | B25J 5/00 700/248 |
| 2012/0084063 A1 | 4/2012 | Drees et al. | |
| 2012/0143536 A1 | 6/2012 | Greaves et al. | |
| 2012/0179692 A1 | 7/2012 | Hsiao et al. | |
| 2012/0215369 A1 | 8/2012 | Desai et al. | |
| 2012/0216123 A1 | 8/2012 | Shklovskii | |
| 2012/0259678 A1 | 10/2012 | Overturf et al. | |
| 2012/0290230 A1 | 11/2012 | Berges Gonzalez et al. | |
| 2012/0310708 A1 | 12/2012 | Curtis et al. | |
| 2013/0060531 A1 | 3/2013 | Burke et al. | |
| 2013/0060720 A1 | 3/2013 | Burke | |
| 2013/0097177 A1 | 4/2013 | Fan et al. | |
| 2013/0097481 A1 | 4/2013 | Kotler et al. | |
| 2013/0173064 A1 | 7/2013 | Fadell et al. | |
| 2013/0253709 A1 | 9/2013 | Renggli et al. | |
| 2013/0261799 A1 | 10/2013 | Kuhlmann et al. | |
| 2013/0262040 A1 | 10/2013 | Buckley | |
| 2014/0006314 A1 | 1/2014 | Yu et al. | |
| 2014/0019319 A1 | 1/2014 | Derby | |
| 2014/0074300 A1 | 3/2014 | Shilts et al. | |
| 2014/0107850 A1 | 4/2014 | Curtis | |
| 2014/0148706 A1 | 5/2014 | Van Treeck et al. | |
| 2014/0163746 A1 | 6/2014 | Drew et al. | |
| 2014/0207292 A1 | 7/2014 | Ramagem et al. | |
| 2014/0337082 A1 | 11/2014 | Nofal | |
| 2014/0337107 A1 | 11/2014 | Foster | |
| 2015/0192911 A1* | 7/2015 | Sloop | G05D 23/1917 700/291 |
| 2015/0227522 A1 | 8/2015 | O'Donnell et al. | |
| 2015/0227846 A1 | 8/2015 | Mercer et al. | |
| 2015/0254246 A1 | 9/2015 | Sheth et al. | |
| 2015/0267935 A1 | 9/2015 | Devenish et al. | |
| 2015/0269664 A1 | 9/2015 | Davidson | |
| 2015/0300831 A1 | 10/2015 | Sernicola | |
| 2015/0310019 A1 | 10/2015 | Royer et al. | |
| 2015/0310463 A1 | 10/2015 | Turfboer et al. | |
| 2015/0310465 A1 | 10/2015 | Chan et al. | |
| 2015/0319119 A1 | 11/2015 | Ryu et al. | |
| 2015/0324819 A1 | 11/2015 | Lin et al. | |
| 2015/0326679 A1 | 11/2015 | Lin et al. | |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Search Report and Written Opinion for PCT Application No. PCT/US2015/038692, dated Sep. 24, 2015, 13 pages.
International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Aragon, Liz, "Black and White Emoticons," posted at Sweet Clip Art, posting date Apr. 29, 2012. © 2011 2015 Elizabeth J. Aragon, available at http://sweetclipart.com/blackandwhiteemoticons838>.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May 19, 2008, 15 pages, available at http://web.archive.orgi/web/20080519220643/bie.berkeley.edu/coolcale/calculations.html.
Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.
Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Blaine, Joel, "Seven Cities and a Utility Company Team Up to Deliver Energy Savings," posted at Dept. of Energy, posting date Aug. 1, 2011, available at http://energy.gov/articles/sevencitiesandutilitycompanyteamdeliverresidentialenergysavings>.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.

(56) References Cited

OTHER PUBLICATIONS

D'urso, M., et al., "A Simple Strategy for Life Signs Detection via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Freepik, Surprised emoticon square face with open eyes and mouth, posted at Flat Icon, posting date not given. © 2013-2015 Graphic Resources SL, available at http://www.flaticon.com/freeicon/surprisedemoticonsquarefacewithopeneyesandmouth_ 42835>.
Friedman, Jerome, et al., "Regularization Paths for Generalized Linear Models via Coordinate Descent," Journal of Statistical Sotfware, vol. 33, Iss. 1, pp. 1-22, Jan. 2010.
Gelber, Bob, "This Is Not a Bill," posted at Not a Mystery, posting date Apr. 18, 2015, available at http://notamystery.com/2015/04/18/not_worth_the_papeUts_printed_on/>.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Karsten, "Green nudge: The classic social comparison experiment by Opower," posted at iNudgeyou, posting date Nov. 28, 2012, available at http://inudgeyou.com/greennudgetheclassicsocialcomparisonexperimenbyopower/>.
Laskey, Alex, et al., "Opower," posted at ACM, posting date Jun. 2011, Copyright © 2015 by the ACM, available at http://xrds.acm.org/article.cfm?aid=1961687>.
Leisch, Friedrich, "FlexMix: A General Framework for Finite Mixture Models and Latent Class Regression in R," Journal of Statistical Software, http://www.istatsoft.org/, vol. 11 (8), pp. 1-18, Oct. 2004.
Liang, Jian, et al. "Load Signature Study—Part II: Disaggregation Framework, Simulation, and Applications," IEEE Transactions on Power Delivery, vol. 25, No. 2, pp. 561-569, Apr. 2010.
Liang, Jian, et al., "Load Signature Study—Part I: Basic Concept, Structure, and Methodology," IEEE Transactions on Power Delivery, vol. 25, No. 2, pp. 551-560, Apr. 2010.
Marshall, Jonathan, "PG&E Home Energy Reports Stimulate Big Customer Savings," posted at PG&E Currents, posting date May 14, 2014, © 2014 Pacific Gas and Electric Company, available at http://www.pgecurrents.com/2014/05/14/pgehomeenergyreports-stimulatebigcustomersavings/>.
Mint.com, "Budgets you'll actually stick to," Budgeting—Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Morabito, Kerri, "High User Campaign," posted at Kerri Morabito, posting date not given, © Kerri Morabito, 2015, available at <URL: http://www.kerrimorabito.com/high-user-campaign.html>.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f.uelband, 7 pages, Jul. 15, 2013.
Rocheleau, Jake, "38 Amazingly Well-Designed Emoji Iconsets," posted at SpyreStudios, posting date Mar. 25, 2015, SpyreStudios © 2015, available at http://spyrestudios.com/38welldesignedemojiiconsets/>.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.

\* cited by examiner

ENERGY AUDIT DEVICE

BACKGROUND

Technical Field

Aspects of this disclosure relate to systems and methods for identifying thermal leaks in a building and in particular, for enabling a utility customer to determine actionable steps that can improve home energy efficiency using an energy audit device.

Introduction

Some utility service providers, such as power utilities, offer services to help their customers improve their resource consumption efficiency. By way of example, some power utility providers offer customers an "energy audit" service in which the customers' homes are tested to identify thermal leaks or other causes of energy waste.

SUMMARY

The following presents a simplified summary of one or more aspects of the subject technology in order to provide a basic understanding of some implementations. This summary is not an exhaustive overview of all contemplated embodiments, and is therefore not intended to identify key or critical elements of all embodiments nor delineate the scope of all aspects of the invention.

Aspects of the technology relate to a an energy audit device configured for identifying sources of thermal energy loss, the energy audit device including, one or more processors, a memory coupled to the processors, and a location module coupled to the processors, wherein the location module is configured to determine a geographic location of the energy audit device. In some aspects, the energy audit device can include one or more environmental sensors coupled to the processors, wherein the processors are configured to execute operations including, receiving, via the one or more environmental sensors, a first set of environmental measurements, and receiving, via the one or more environmental sensors, a second set of environmental measurements. In some aspects, the processors can be further configured to perform operations including, identifying one or more thermal energy leaks at a building location based on the first set of environmental measurements and the second set of environmental measurements.

In another aspect, the subject technology relates to a computer-implemented method for identifying one or more sources of thermal energy loss, the method including steps for receiving, by a processor, a first environmental reading including a first location associated with a first temperature measurement, and receiving, a second environmental reading including a second location associated with a second temperature measurement. In some aspects, the method can also include steps for analyzing the first environmental reading and the second environmental reading to identify one or more thermal energy leaks in a building associated with the first location and the second location.

In yet another implementation, the technology relates to a non-transitory computer-readable storage medium including instructions stored therein, which when executed by one or more processors, cause the processors to perform operations including, receiving a first environmental reading including a first location associated with a first temperature measurement, receiving a second environmental reading including a second location associated with a second temperature measurement, and sending the first environmental reading and the second environmental reading to a remote system, wherein the remote system is configured for identifying thermal leaks. In some aspects, the operations can also include, receiving a leak notification from the remote system, wherein the leak notification provides information regarding one or more thermal energy leaks in a building associated with the first location and the second location.

BRIEF DESCRIPTION OF THE DRAWINGS

In the following description, reference is made to figures that show, by way of illustration, specific examples in which the subject technology can be practiced. It is understood that other aspects can be utilized and changes made without departing from the scope of the subject technology. In the figures.

DETAILED DESCRIPTION

Figure 1:
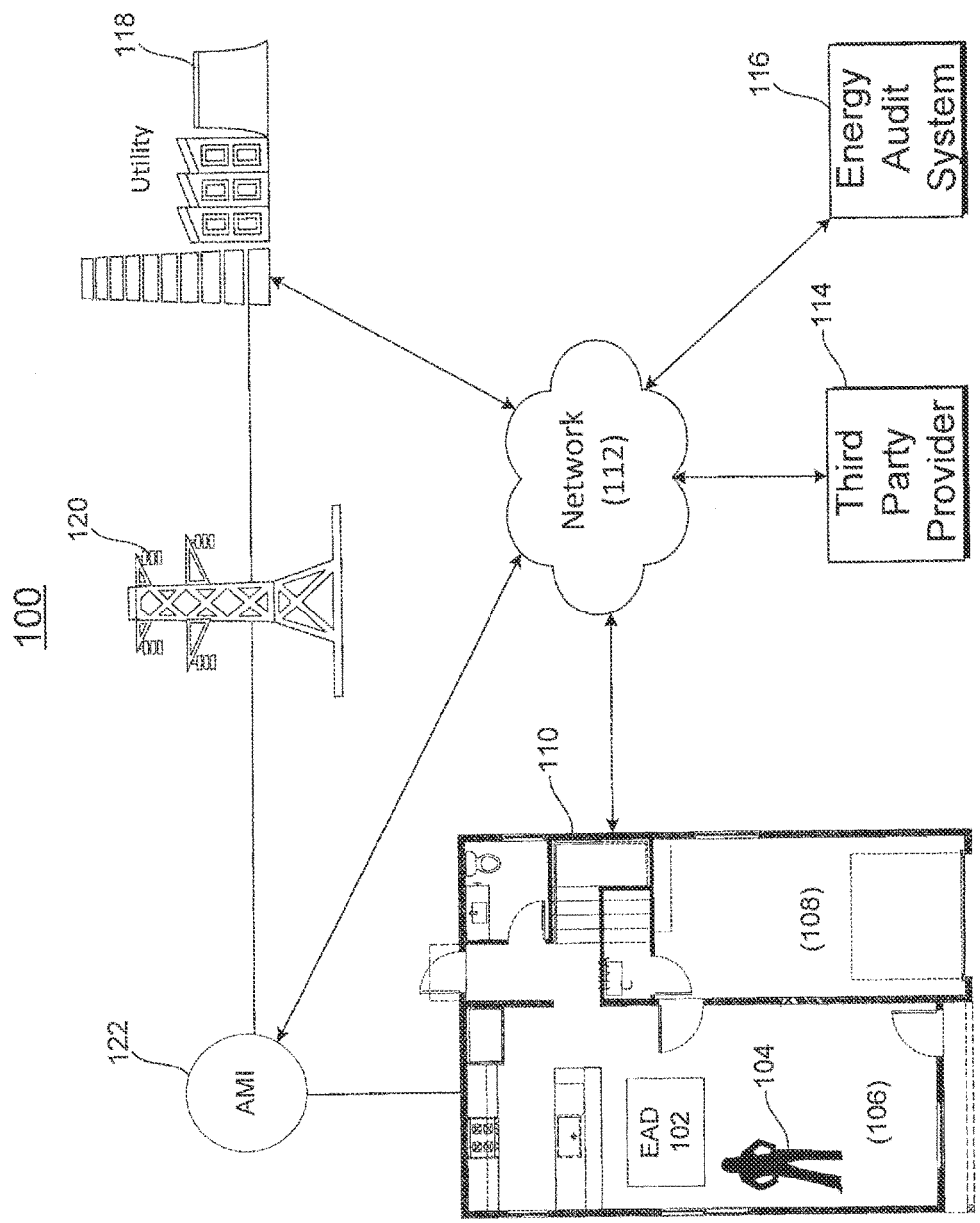
FIG. 1 illustrates an example environment in which an energy audit device (EAD) can be implemented.

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One issue faced by consumers is the problem of reducing expenses for consumable resources, such as electric power. To this end, consumers may be interested in power conservation programs or strategies to help reduce monthly energy use. In some instances, energy audits can help utility customers (e.g., power utility customers) identify sources of energy waste, such as poor insulation or thermal leaks. Some utility providers offer energy audit services, (e.g., home energy audits for residential customers), to help customers improve their consumption efficiency, thereby helping reduce waste and expense. Although energy audits can be beneficial for utility customers and providers alike, auditing services can require visitation to the consumption site (e.g., by a utility representative), as well as specialized instrumentation that must be used by a trained auditor. As a result, although home energy audits can be useful, many utility customers may not perform them due to the associated inconvenience and expense.

Aspects of the subject technology address the foregoing issues by providing a low-cost and easy to use energy audit device (e.g., an "energy audit device" or "audit device")

designed for use by an end-user, such as a utility customer, and configured to provide feedback regarding steps that can be taken to improve power efficiency at the resource consumption site (e.g., a customer's home or business location). An audit device can include hardware and software necessary to identify thermal leaks based on environmental variations, and to provide customer notifications, for example, to indicate one or more actionable steps that the customer may perform to increase thermal efficiency of the tested location.

Device Configurations:

As discussed in further detail below, a home energy audit device of the subject technology can be configured for autonomous functionality or in conjunction with a host device, such as a smart phone, personal computer (PC) or tablet computer. Additionally, the measurement of environmental variables and analysis of data necessary to identify thermal leaks and provide actionable customer notifications can be performed locally, e.g., at a location of the energy audit device, or by a remote system, e.g., through the transaction of information and processing results with one or more remote servers over a computer network.

An energy audit device can include multiple hardware and software modules necessary to measure various environmental variables (e.g., temperature, location, pressure and/or humidity), as well as to communicate with other devices, such as a local host or remote system/s or server/s. In one example, an energy audit device can be configured to attach to/communicate with a host device (e.g., a smart phone), so that the device can utilize hardware and software functionality of the host, such as user inputs and displays (e.g., a smart phone touch screen), and communications/processing capabilities (e.g., WiFi and/or cellular network connectivity).

In other approaches, the audit device can be configured as a stand-alone system, including hardware and software necessary for autonomous functionality. In stand-alone implementations, the audit device can include one or more processors, a memory, a position/location module, environmental sensors (e.g., humidity and/or temperature sensors), a communication module and/or a user interface. As discussed in further detail below, hardware components of the audit device can vary depending on implementation and cost considerations. For example, a user interface of the audit device can include a display screen (e.g., a capacitive touch-based display), and/or one or more lights or indicators to provide user output. Similarly, a communication module of the audit device can be configured such that the audit device is operable as a client and can be attached/detached from a host, such as a smart phone, personal desktop assistant (PDA), a smart thermostat device, and/or tablet computer, etc. In other implementations, the communication module may be configured for network communication, e.g., by transacting information with a WiFi computer network (e.g., via a router or hot-spot), local area network (LAN), or wide area network (WAN), etc.

Use Cases:

In operation, an energy audit device functions to help diagnose thermal leaks in a building location, such as in one or more rooms in a utility customer residence or business location. By better understanding the predominant causes of undesired heat transfer, the energy audit device can help users perform steps to improve energy efficiency at the consumption site. In some instances, thermal energy leaks can result from properties, configurations or qualities of a building's design that can be easily changed to reduce heat loss (or heat absorption) in relation to outside weather conditions.

By providing user feedback and recommendations, the energy audit device can be used to indicate actionable steps the user can take to improve energy efficiency at the building location. In some approaches discussed below, the information collected by the audit device can also be used to determine other types of information that may be provided to the user, e.g., through a behavioral demand response (BDR) notification campaign, marketing materials, or information regarding utility incentive programs, etc.

By way of example, information collected by the energy audit device may be used to inform and improve energy usage disaggregation data, for example, whereby a customer's power usage data is broken down by usage type (e.g., heating, cooling, lighting, appliances, etc.). Information collected from an energy audit may also be used to improve or personalize energy savings tips, for example, that are delivered to the user of the energy audit device to encourage energy savings. In some aspects, energy audit information may be used to facilitate the targeting of user communications and/or for improving models of energy consumption, e.g., for the purpose of energy trading.

In some aspects, information provided by the energy audit device can indicate that thermal leaks can be remedied through building improvements, such as upgrades to insulation or windows (e.g., an upgrade from single pane to double-pane windows). In other aspects, the energy audit device may provide guidance on how to reduce or eliminate drafts, such as by modifying building airflow or ventilation in a room or hallway. By way of further example, other improvements that can be suggested include, but are not limited to: tips for insulating a heating ventilating air conditioning (HVAC) system, insulating pipes, installing dampers in exhaust ducts (e.g., for dryer exhaust) to prevent outside air from entering the building, installing storm doors/storm windows, and/or other weatherization procedures.

FIG. 1 illustrates an example environment 100 in which an energy audit device (EAD) 102 can be implemented. Environment 100 includes a residence (building 110) containing rooms 106, 108. Additionally, environment 100 includes a utility 118 coupled to power grid 120, as well as a network 112 coupled to third party provider 114 and energy audit system 116. In the example of environment 100, third-party provider 114 can represent any non-utility provider, such as an information system, database, business or service configured to provide data and/or customer notification services. In turn, energy audit system 116 represents a remote system configured to perform energy audits for one or more consumption locations, based on received environmental measurements, as discussed in detail below.

It is understood that environment 100 provides example devices and a communication topology that can be used to implement aspects of the technology. However other configurations can be used without departing from the scope of the invention. For example, environment 100 may include additional information providers, utility providers and/or building locations, without departing from the scope of the invention.

In environment 100, utility 118 represents a power utility, however, it is understood that utility 118 can represent a provider of other resource types such as water and/or gas. In turn, energy audit system 116 and third party provider 114 are respectively depicted as discrete systems; however, each can be implemented using distributed hardware and/or software implementations, for example, employing data centers, distributed systems or computing clusters, etc.

In the example of FIG. 1, building 110 represents a residential building occupied by user 104 that is associated with EAD 102. In practice, user 104 can use EAD 102 to make determinations about the existence of thermal leaks in building 110. Specifically, EAD 102 can utilize environmental sensors to take environmental measurements in a particular location, such as in a specific room within building 110, e.g., room 106. Using the environmental measurements, EAD 102 can identify thermal leaks, for example, on a window-by-window, wall-by-wall, or a room-by-room basis. Additionally, EAD can be used to identify a type of thermal leak, i.e., whether the leak is due to poor insulation (e.g., single pane windows) or air flow issues, such as a draft due to poor or improper insulation.

Environmental measurements made by EAD 102 can also vary depending on implementation. For example, in some approaches, temperature and location measurements may be used to determine the existence of thermal leaks. In such implementations, user 104 can operate EAD 102 in order to take a first temperature reading in a particular location (e.g., a first location) in room 106. Subsequently, user 105 can use EAD 102 to take a second temperature reading at a different location (e.g., a second location) in room 106. In instances where there is significant variance between two or more temperature instances in a single room (e.g., room 106), EAD may be used to infer that there is an insulation issue with the room, for example, due to poorly insulated (or installed) windows, or doors.

In yet another example, environmental sensors of EAD 102 can include humidity sensors for taking humidity measurements either alone or in conjunction with temperature measurements, as discussed above. In such implementations, temperature and humidity measurements can be taken by EAD 102 at various locations in a room in order to identify the existence of thermal leaks. By way of example, in instances where significant variation exists between temperature measurements alone (and not humidity measurements), it may be inferred that the thermal leaks are due to defective insulation. However, in instances where there are signification variations between different temperature and humidity measurements (taken together) within a single room, it may be inferred that thermal leaks are due to air flow problems, e.g., due to a draft or heating ventilating air-conditioning (HVAC) malfunction.

It is understood that drafts may result from other types of building defects, including but not limited to: structural bypasses (e.g., cracks, gaps, and holes in and/or around doors, windows, pipes, and wiring, etc.), recessed lighting, unsealed air ducts, missing/degraded exhaust duct dampers, and/or plaster cracks in ceilings and walls, etc.

As discussed in further detail below, analysis necessary to identify one or more thermal leaks can be performed locally on EAD 102, or by one or more remote systems, such as energy audit system 116. Further to the above examples, environmental measurements collected by EAD 102 can be transmitted to energy audit system 116, e.g., via network 112, where processing is performed in order to determine the existence (and likely cause) of thermal leaks. In such approaches, EAD 102 can be configured to communicate with network 112, for example, via a WiFi access point (not illustrated) in or proximate to building 110. Once one or more thermal leaks are identified by energy audit system 116, the results of the energy audit is transmitted back to user 104 e.g., via network 112 and EAD 102. Alternatively, user notifications can be provided to user 104 using a different communication channel, such as email, SMS message, interactive voice response (IVR), and/or physical mailers, etc. In some aspects, communication channel choices may be governed by user preference, or based on metrics of historic user engagement with respect to previous communications received from utility 118 and/or third party provider 114.

User notifications can provide a variety of information, including details regarding the number and type of thermal leaks in a building location (e.g., a room within a power consumption site). By way of example, a notification provided to user 104 may indicate a thermal leak in room 108, but not in room 106. Notification information can also provide steps, hits or tips to user 104, for example, to facilitate the repair of issues relating to thermal leaks, such as building insulation or ventilation configurations. By way of example, the notification information may provide a list of vendors for material upgrades (e.g., double-pane windows) that may be used to remedy the indicated issues.

Environmental measurement information collected by EAD 102 can be used in conjunction with other information about the consumption site and/or user behavioral patterns in order to generate notification content that is provided to user 104. For example, advanced metering infrastructure (AMI) device 122 can be used to collect information about energy consumed via power grid 120. Depending on implementation, AMI device 122 may collect consumption information on different time intervals, e.g., every fifteen minutes, or on a minute-by-minute, hourly, weekly, or monthly basis, etc. Alternatively, energy consumption information may be collected (e.g., by utility 118) without the use of an AMI device. For example, utility 118 may collect resource consumption data for building 110 using in-person meter reading methods, or data over power line collection, etc.

Taken together with environmental measurement data collected by EAD 102, power consumption information can be used to help drive the generation of targeted user content, or facilitate the ability to provide recommendations about how a thermal leak issue may be addressed. By way of example, historic consumption data may be used to determine that user 104 does not have or use a heating ventilating or air condition (HVAC) system, therefore, HVAC malfunction may be ruled out as potential causes of a draft issue in building 110.

Energy audit notifications may be further based on demographic information for user 104. In some instances, demographic information provided by a third party (e.g., third party provider 114) can be supplied to energy audit system 116. It is understood that demographic information can be collected (and provided) by a variety of sources and may include one or more of: consumption site location, residence or business size, building zoning type, neighborhood identification information, residence ownership status, and/or electric vehicle ownership status, etc.

In conjunction with environmental measurements provided by EAD 102, energy audit system 116 can formulate targeted customer notifications, e.g., for user 104, to provide tips on how to reduce or eliminate one or more identified thermal leaks. A more detailed explanation of how an EAD may be deployed in various configurations are discussed in greater detail with respect to FIG. 2.

Figure 2:
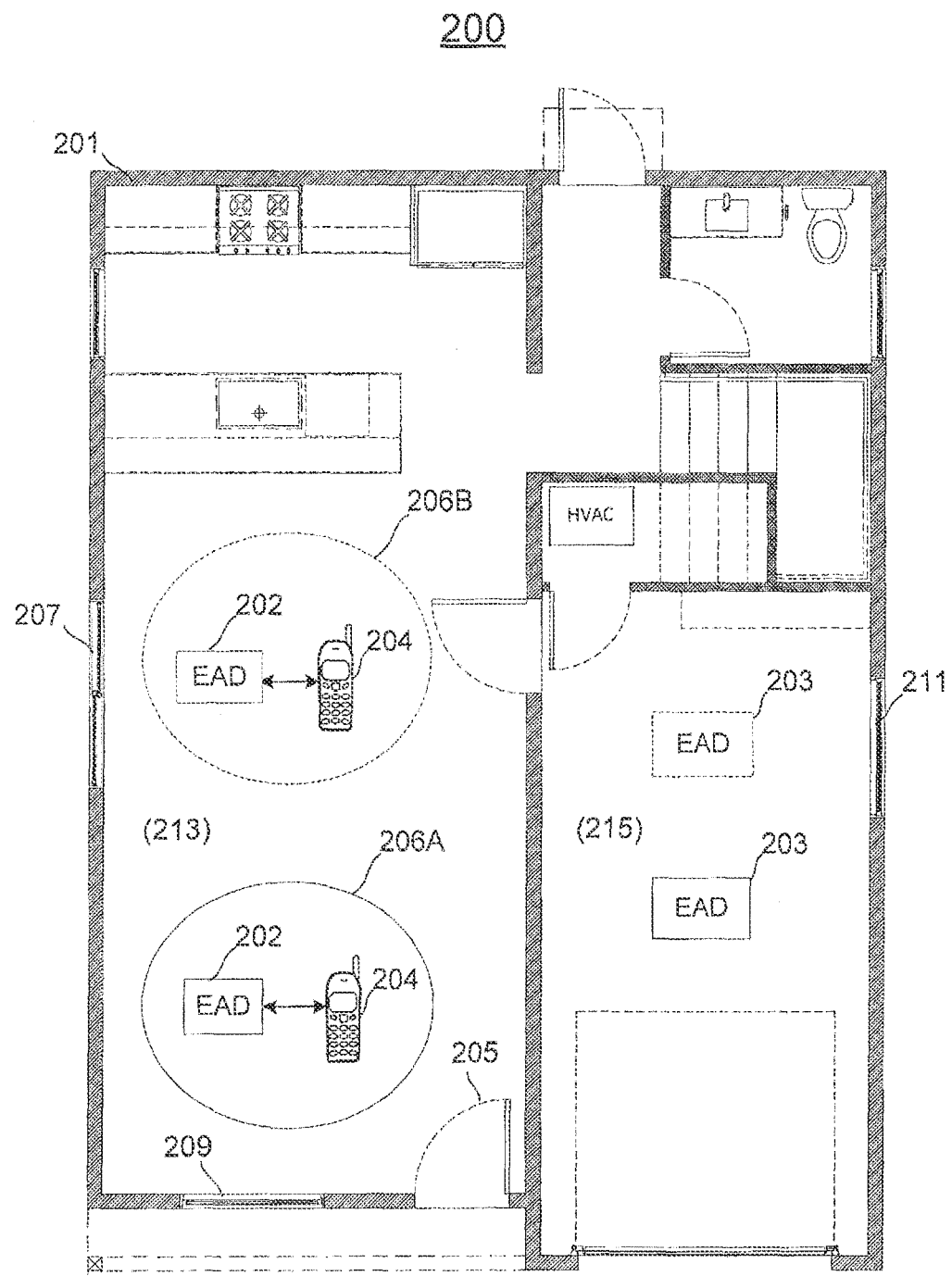
FIG. 2 illustrates another example environment in which an energy audit device may be implemented.

FIG. 2 illustrates another example environment 200 in which EADs of different configuration types are implemented. Environment 200 illustrates two example EAD configurations in separate rooms, e.g., room 213 and room 215, respectively. The example EAD configurations include a first EAD 202 in a client/host configuration (room 213), as well as a second EAD 203 in a stand-alone (autonomous) configuration (room 215).

In the example of environment 200, EAD 202 is configured to be coupled to a host device, i.e., smart phone 204. Although smart phone 204 is provided as an example, it is understood that various other host devices can be implemented without departing from the invention. For example, EAD 202 may be configured to be communicatively coupled with a tablet computing device, or a personal computer (such as a laptop or desktop PC), etc. In contrast, EAD 203 is configured for stand-alone operability and includes hardware and software necessary to take environmental measurements, identify the existence of thermal leaks, and/or notify an operating user of steps to increase thermal efficiency of the corresponding room or building location.

In practice, EAD 202 which is coupled to smartphone 204, can be operated at multiple locations and comparing measurements to identify potential thermal leaks. By way of example, EAD 202 may be operated via an input and/or display provided by host (smart phone) 204. Thus, a user operating EAD 202 can take a first set of environmental measurements at first location (e.g., location 206A), and then a second set of environmental measurements at second (different) location (e.g., location 206B). In configurations wherein EAD 202 is operated in a client/host configuration, processing hardware and software necessary for analyzing environmental measurements to identify thermal leaks can be provided by the host (e.g., smart phone 204), whereas environmental sensors reside in a housing of EAD 202. Depending on design implementation, a location or position module e.g., a global positioning system (GPS) can be included in either the EAD 202 and/or the smartphone 204, e.g., for providing position/location information that is correlated with environmental measurements, such as temperature and humidity.

In another implementation, the hardware and software necessary to process collected information (e.g., environmental measurements) may reside on EAD 202, and the host device (e.g., smartphone 204) can be used to receive input from a user and/or to provide output/notifications to the user. That is, EAD 202 can include memory, processors, sensors and software necessary to retrieve, store and analyze environmental measurements. However, user interface functionality can be handled by hardware and software native to smartphone 204. User queries provided via smartphone 204 can be used to prompt an operating user for additional information, for example, about the properties of building 201, such as, properties of one or more windows 207, 209 or doors 205, etc.

In yet another implementation, a host device (e.g., smartphone 204) can be used as a proxy to facilitate communication between a client EAD device (e.g., EAD 202) and one or more remote systems. For example, EAD 202 can use communications functionality of smartphone 204, such as WiFi or cellular network connectivity, in order to communicate with a remote system, such as energy audit system 116, discussed above with respect to FIG. 1.

Figure 3:
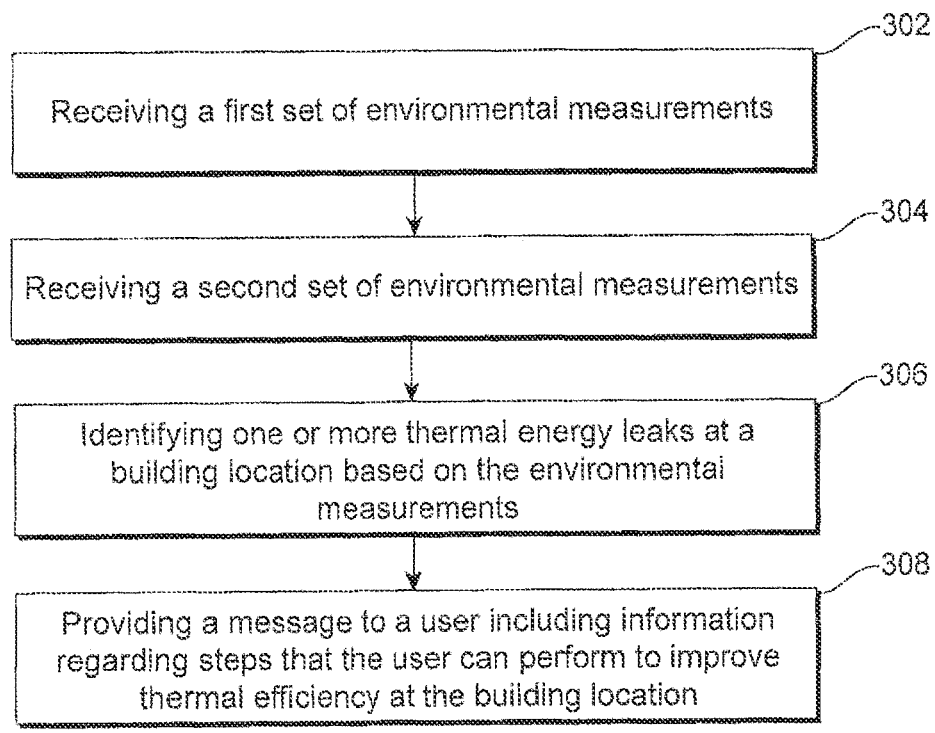
FIG. 3 illustrates steps of an example process that can be performed to identify a thermal leak in a building location.

FIG. 3 illustrates steps of an example process 300 that can be performed to identify a thermal leak and provide a user notification regarding the same. Process 300 begins with step 302 in which a first set of environmental measurements are received, e.g., by an EAD device and/or an energy audit system 116, as discussed above. The first set of environmental measurements can include various types of data, including but not limited to one or more of: temperature, humidity, pressure, location, and/or weather data. The first set of environmental measurements can be taken at a first location e.g., within a room of a building or consumption site. In some implementations, the location of the first set of environmental measurements can be at a center of the room, for example, to record a baseline set of measurements that can be compared to one or more subsequent environmental measurements, as discussed further below.

Certain types of data, such as weather data may be provided by an independent third-party source, such as an online weather service or data repository (e.g., third party provider 114, discussed above). Additionally, other data may be provided by the user, for example, in response to one or more prompts to provide information about various aspects of the building and building environment. Although user prompts may be provided to inquire about virtually any aspect of the building or surrounding environs, some potential examples include: inquiries about the age of the building, inquiries regarding building configuration or insulation materials, and/or inquiries about thermostat settings, etc.

In step 304, a second set of environmental measurements can be received e.g., by an EAD device and/or an EAD processing system, such as energy audit system 116. Although, the second set of environmental measurements may be taken at any position within the same building location, in some aspects the second set of environmental measurements are taken in the same room, or in a common building space as that of the first set of environmental measurements. In some aspects, the second set of environmental measurements are measured at a different location within the same room or building location as the first set of environmental measurements. As indicated above, the first set of environmental measurements may be taken at a center of the room, e.g., to function as a "baseline" environmental reading. In contrast, the second set of measurements may be taken at a different location, such as on the periphery of a room, near a window, door, vent, passageway, or other potentially problematic location or building feature.

Environmental measurements can include location/position information such as GPS coordinate information, for example, that is recorded or measured using a location/position module, such as a GPS device. In other aspects, position/location information can identify a room location, such as a label that indicates a room type (e.g., "bedroom" or "living room") and/or a relative position within a given room, such as a room "center" or "periphery," etc.

In some approaches, collected environmental information (including position/location information) can be communicated to another device or system for processing. As discussed above, a local host device, such as a smart phone, can be configured to receive data from the EAD, and can be used to perform some of the analysis that is used to identify thermal leaks, as discussed with respect to step 306, below.

In yet another implementation, the EAD can be configured to collect environmental measurements and to transmit environmental measurement data to a remote system (e.g., energy audit system 116). In such approaches, the EAD can be configured to directly communicate with a computer network or networking hardware, for example, via a router or WiFi access point. Alternatively, a host device (e.g., a smart phone or tablet computer) may be used as a proxy to provide communication capabilities necessary to transact data with the remote system.

Once multiple environmental measurements are received, process 300 proceeds to step 306 in which one or more thermal leaks are identified at the building location based on the environmental measurements. As discussed above, identification of thermal leaks can be based on additional information, such as information provided by the user (e.g., regarding building properties), information provided by a smart thermostat device (e.g., regarding a thermostat set point or HVAC program), and/or information provided by one or more third parties, such as weather data or demographic information for the building site or associated user.

Identification of thermal leaks can be performed by comparing the first set of environmental measurements (at a first room location) with the second set of environmental measurements (at as second room location), and analyzing differences in temperature, humidity and/or position for each of the measurement sets. By comparing various environmental measurements for a common building space or location (e.g., a room), thermal leaks can be identified based on disparities between the measurements. As discussed in further detail below, comparisons between temperature measurements can be used to infer thermal leaks (i.e., heat loss) or drafts.

By way of example, in instances where there are variations in temperature (but not humidity), it can be inferred that there are insulation problems with the building that are causing heat loss (or heat gain). In instances where there are temperature differences and humidity differences, it may be inferred that there are insulation and/or draft problems with the room. Where there are no temperature differences, but differences in humidity, it may be determined that the building does not have a heat transfer problem, but may be at risk for other environmental problems, such as mold, for example, resulting from high relative humidity. Lastly, in instances where there are no temperature or humidity differences, it may be inferred that the room location is not subject to heat transfer problems.

It is understood that the amount of variance between environmental measurements (e.g., for either temperature or humidity measurements) that may indicate a heat transfer concern can vary with implementation. For example, heat/humidity disparities about a predetermined difference threshold may be predetermined (e.g., by a user calibrating the audit device). Alternatively, heat or humidity thresholds may be set based on weather information and/or a location (e.g., a geographic location of the audit device). By way of example, temperature disparities (e.g., between the first environmental measurement and the second environmental measurement) that exceed 5° F. may indicate a thermal-loss issue. In a similar approach, disparities in relative humidity measurements exceeding 7% (e.g., between the center of a room and the periphery of the room) may indicate a draft related problem.

Additionally, as understood by those of skill in the art, insulation problems can result from material defects (e.g., in building materials or insulation), and design or configuration issues including, but not limited to: poorly insulated windows, doors, or wall insulation. Other causes of drafts may also include: structural bypasses (e.g., cracks, gaps, and holes in and around doors, windows, pipes, and wiring), recessed lighting, unsealed air ducts, missing/degraded exhaust duct dampers, and plaster cracks in ceilings and walls. Other causes of thermal leaks include: uninsulated pipes, lack of roofing insulation, single-pane/unglazed windows, etc.

By way of further example, where there are signification variations in temperature and humidity, it can be inferred that the thermal leak is due to a draft and/or an insulation problem. Depending on the building location, draft issues can be caused by open doors, windows, or malfunctioning HVAC systems, etc.

In step 308, a message or notification is provided to the user, including information regarding steps that the user can perform to improve thermal efficiency at the room or building location. User notifications resulting from an energy audit analysis can include various types of information, or links to various information resource, such as hyperlinks for materials or services.

By way of example, the message or notification may simply identify likely causes of thermal energy loss at an associated building location. However, in other implementations, additional types of information can be provided, such as actionable steps to reduce heat transfer, or recommendations for further information resources or professional services that may be helpful in improving energy efficiency at the consumption site. Additionally, energy audit information may be used to drive targeted advertisements (e.g., for home building supplies or services directed to home energy efficiency improvements).

User messages can be delivered directly by an EAD (e.g., EAD 102, or EAD 203) to the user, or may be delivered by a proxy device, such as a host device (e.g., EAD 202). User messages may be delivered using one or more remote systems, such as energy audit system 116, discussed above. In yet other implementations, information collected by an EAD may be used to segment users for inclusion in energy efficiency and/or customer engagement programs, such as Behavioral Demand Response, Home Energy Reports, Unusual Usage Alerts, etc. In approaches wherein user messages are delivered from a remote device or server, the communication channel used to reach the user can vary depending on different factors. For example, one or more indicated user preferences may be used to determine that the user wishes to receive notifications/messages via a particular communication channel, such as email, SMS, interactive voice response (IVR), physical (print) mailers, and/or a smart thermostat device, etc.

Figure 4:
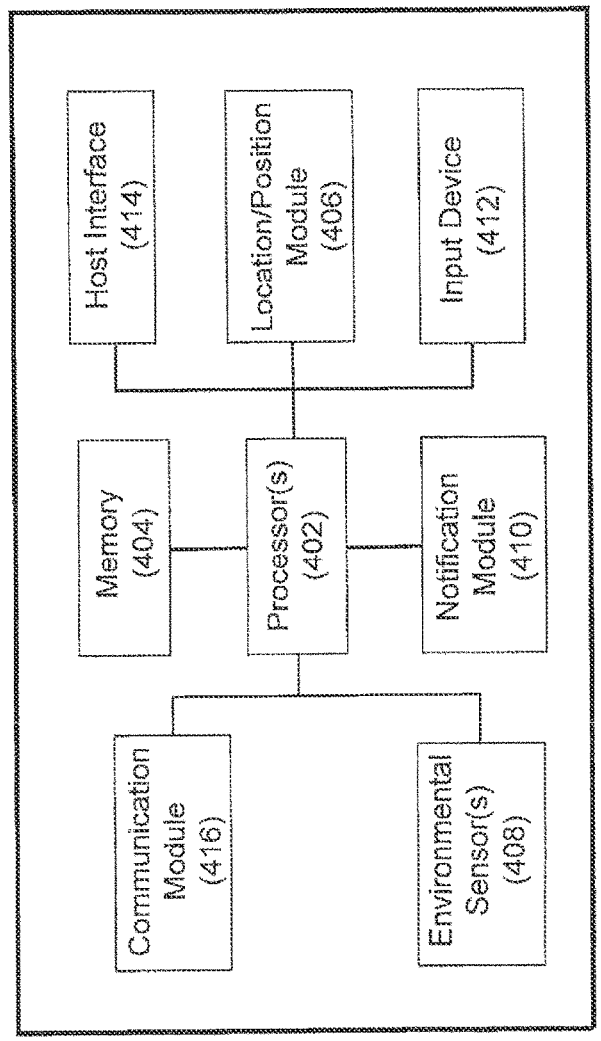
FIG. 4 illustrates a block diagram of example components that can be implemented in an energy audit device.

FIG. 4 illustrates a block diagram of example components that can be implemented in an energy audit device (EAD) 400, according to some aspects. EAD 400 includes processors 402 coupled to a memory 404 that can be configured to store instructions for collecting environmental measurements and identifying thermal leaks in a building location, as discussed above with respect to example process 300. As further illustrated, EAD 400 includes location/position module 406, environmental sensors 408, notification module 410, an input device 412, host interface 414, and a communication module 416—all of which are coupled to processors 402.

In operation, EAD 400 can collect environmental measurements using environmental sensors 408. Environmental sensors 408 can include one or more temperature or humidity sensing devices, such as an infra-red thermometer, and/or humidity sensor. Depending on implementation, a fewer (or greater) number of sensors and sensor types may be used. For example, environmental sensors 408 can include one or more accelerometers, electromagnetic sensors, air quality sensors, noise sensors and/or pressure sensors, etc.

Environmental measurement data is correlated with a position or location of EAD 400 using location/position module 406. The location/position module 406 can include one or more location or motion sensing devices, including but not limited to: a GPS chip, one or more accelerometers, and/or a WiFi location module, etc.

Collected environmental measurement data can be stored in memory 404, or transmitted to a host device or remote system (see FIG. 1). By way of example, environmental measurement data may be transmitted from EAD 400 to a host device e.g., via host interface 414. Alternatively, data may be transacted with a remote system (such as energy audit system 116) via a communication module 416. In such approaches, communication module 416 can include hardware, firmware and/or software necessary to communicate with one or more networking components or devices, such as a WiFi chipset, Bluetooth™ device, or Ethernet interface.

EAD 400 is also configured to receive inputs and data directly from an operating user, e.g., via input device 412. Further to the above examples, input device 412 may be used by the user to provide certain types of information, such as information indicating demarcations between rooms in a building location, thermostat setting information, weather information, or data pertaining to properties or qualities of the building location.

In turn, output generated by EAD 400 can be provided to a user/operator via notification module 410. Depending on the desired implementation, notification module 410 can include various types of hardware, including but not limited to: one or more speakers, lights, light emitting diodes (LEDs), or display devices (e.g., a capacitive touch screen).

Figure 5:
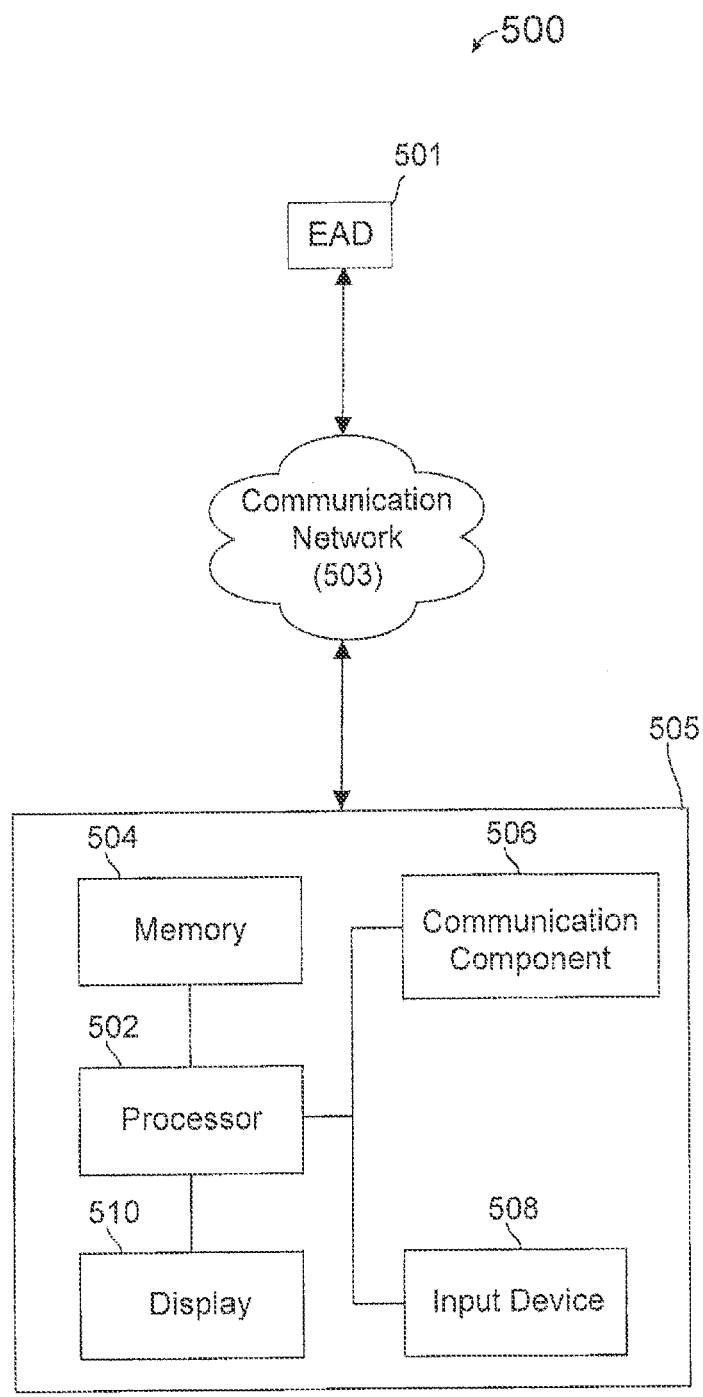
FIG. 5 illustrates a conceptual environment, including hardware components that can be used to implement a remote energy audit system, according to some aspects of the technology.

FIG. 5 illustrates an example environment 500 in which environmental measurement information collected by e.g., by an EAD 501 and provided to an energy audit system (e.g., energy audit system 116). Environment 500 includes an EAD 501 communicatively connected to energy audit system 505, e.g., via communication network 503. Energy audit system 505 includes processor 502 for executing instructions stored in memory device or element 504. The instructions can cause energy audit system 505 to execute a computer-implemented method, for example, to identify one or more thermal energy leaks in a building location associated with EAD 501.

As would be apparent to one of skill in the art, energy audit system 505 can include various types of memory, data storage, and/or non-transitory computer-readable storage media, such as a first data storage for program instructions for execution by the processor 502, a separate storage for usage history or user information, a removable memory for sharing information with other devices, etc. Energy audit system 505 can also include one or more communication components 506, such as a Wi-Fi, Bluetooth®, radio frequency, near-field communication, wired, and/or wireless communication systems, etc.

Energy audit system 505 can communicate with a network (e.g., network 503), such as the Internet, and can be configured to communicate with other such devices, such as one or more smart thermostat device, demand response devices, and/or AMI metering devices. Computing device 505 may also include at least one input device 508 configured to receive input from a user. Such inputs may include, for example, one or more push button/s, touch pad/s, touch screen/s, wheel/s, joystick/s, keyboard/s, a mouse, keypad/s, or other such devices or elements enabling a user to input a command to the device. In some aspects, however, such a device may not include any buttons at all, but rather controlled through a combination of visual and audio commands, such that a user can manipulate data input to the device without direct physical contact. Energy audit system 505 can also include a display element 510, such as a touch-screen or liquid crystal display (LCD).

The various aspects can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In aspects utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. An energy audit device configured for identifying one or more sources of thermal energy loss, the energy audit device comprising:
    one or more processors;
    a memory coupled to the processors;
    a location module coupled to the processors; and
    one or more environmental sensors located in a building and configured to communicate to the processors by electronic communications, and
    wherein the processors are configured to execute operations in response to executing instructions stored in the memory, the operations comprising:
        receiving, via the one or more environmental sensors, a first set of environmental measurements from a first room in the building;
        receiving, via the one or more environmental sensors, a second set of environmental measurements from the first room in the building;
        identifying one or more thermal energy leaks in the first room of the building based on comparing the first set of environmental measurements and the second set of environmental measurements;
        in response to the first set of environmental measurements being different from the second set of environmental measurements by a variance over a threshold:
        identifying a type of energy leak as a leak caused by an insulation issue;
        generating a notification message that identifies the first room and the insulation issue with an actionable step to reduce the insulation issue; and
        transmitting, via a network, the notification message to a remote device associated with the building to cause the actionable step to be performed.

2. The energy audit device of claim 1, further comprising:
    a notification module coupled the processors, and
    wherein the processors are further configured to execute operations comprising:
        providing, via the notification module, a message to a user of the energy audit device, wherein the message comprises information regarding the actionable step comprising one or more steps that the user can perform to improve thermal efficiency at the building location.

3. The energy audit device of claim 2, wherein the message to the user provides information regarding one or more thermal energy leaks at the building location due to a draft or insufficient insulation.

4. The energy audit device of claim 1, further comprising:
    an input module coupled to the processors, and
    wherein the processors are further configured to perform operations comprising:
        receiving, via the input module, user input provided by a user in response to one or more prompts, and
        wherein identifying the one or more thermal energy leaks at the building location is further based on the user input.

5. The energy audit device of claim 1, wherein the one or more environmental sensors comprises one or more of: a temperature sensor, a humidity sensor, or a global positioning system (GPS) device.

6. The energy audit device of claim 1, further comprising:
    a communication module coupled to the processors, wherein the communication module comprises one or more of: a Bluetooth device, a WiFi transceiver, or a smart phone interface.

7. The energy audit device of claim 1, wherein the location module is configured to determine a geographic location of the energy audit device.

8. The energy audit device of claim 1, wherein the location module is configured to identify a relative position within the building location.

9. A computer-implemented method performed by a computing device including at least a processor, the method comprising:
    receiving, by the processor, a first environmental reading measured by one or more of a plurality of environmental sensors from a first location in a first room wherein the first environmental reading includes a first temperature measurement;

receiving, by the processor, a second environmental reading measured by one or more of the plurality of environmental sensors from a second location in the first room wherein the second environmental reading includes a second temperature measurement;

analyzing, by the processor, the first environmental reading and the second environmental reading to identify one or more thermal energy leaks in the first room;

in response to the processor determining that the first environmental reading is different from the second environmental reading by a variance over a threshold:

identifying, by the processor, a type of energy leak as a leak being caused by an insulation issue;

generating, by the processor, a notification message that identifies the first room and the insulation issue with an actionable step to reduce the insulation issue; and transmitting, by the processor via a network, the notification message to a remote device associated with the building to cause the actionable step to be performed.

10. The computer-implemented method of claim 9, wherein both the first location and the second location reside within the same room in the building.

11. The computer-implemented method of claim 9, further comprising:

generating a notification alert, wherein the notification alert comprises information identifying one or more actions that can be taken to eliminate or reduce the one or more thermal energy leaks in the building; and providing the notification alert to a user.

12. The computer-implemented method of claim 11, wherein the one or more actions comprise steps for eliminating or reducing a draft.

13. The computer-implemented method of claim 11, wherein the one or more actions comprise steps for improving or fixing an insulation barrier.

14. The computer-implemented method of claim 9, further comprising:

sending information regarding the type of energy leak to a remote server via a communication network; and receiving, from the remote server, a notification alert, wherein the notification alert comprises information identifying one or more actions that can be taken to eliminate or reduce the type of energy leak in the building.

15. The computer-implemented method of claim 9, further comprising:

transmitting, via a host interface, information regarding the type of energy leak to a host device; and receiving, via the host interface, a notification alert, wherein the notification alert comprises information identifying one or more actions that can be taken to eliminate or reduce the type of energy leak in the building.

16. The computer-implemented method of claim 9, wherein the first environmental reading further comprises a first humidity measurement, and wherein the second environmental reading further comprises a second humidity measurement.

17. A non-transitory computer-readable storage medium comprising instructions stored therein, which when executed by one or more processors, cause the processors to:

read, via one or more environmental sensors mounted in a building, a first set of environmental measurements from a first location in a first room in the building;

read, via the one or more environmental sensors, a second set of environmental measurements from a second location in the first room;

identify one or more thermal energy leaks in the first room of the building based on comparing the first set of environmental measurements and the second set of environmental measurements, comprising:

based on the comparison, in response to the first set of environmental measurements being different from the second set of environmental measurements by a variance over a threshold:

identify, by the processor, a type of energy leak as a leak caused by an insulation issue;

generate, by the processor, a notification message that identifies the first room and the insulation issue with an actionable step to reduce the insulation issue; and transmit, by the processor via a network, the notification message to a remote device associated with the building to cause the actionable step to be performed.

18. The non-transitory computer-readable storage medium of claim 17, the instructions further comprising instructions for causing the processor to:

transmit a message to a user associated with an energy audit device, wherein the message comprises at least a portion of the notification message.

19. The non-transitory computer-readable storage medium of claim 17, the instructions further comprising instructions for causing the processor to:

providing transmit a message to a user associated with an energy audit device, wherein the message comprises information regarding one or more steps that the user can perform to improve thermal efficiency at the building associated with the first location and the second location.

* * * * *